(12) United States Patent
Liu

(10) Patent No.: US 9,845,125 B1
(45) Date of Patent: Dec. 19, 2017

(54) MULTIPURPOSE STAND

(71) Applicant: Yiang-Chou Liu, Taipei (TW)

(72) Inventor: Yiang-Chou Liu, Taipei (TW)

( * ) Notice: Subject to any disclaimer, the term of this patent is extended or adjusted under 35 U.S.C. 154(b) by 0 days.

(21) Appl. No.: 15/356,575

(22) Filed: Nov. 19, 2016

(51) Int. Cl.
*B62B 5/00* (2006.01)
*B62B 3/02* (2006.01)
*B62B 3/10* (2006.01)
*B62B 3/00* (2006.01)
*B62H 3/08* (2006.01)
*A47B 61/00* (2006.01)

(52) U.S. Cl.
CPC ............... *B62H 3/08* (2013.01); *A47B 61/00* (2013.01); *B62B 3/02* (2013.01); *B62B 3/10* (2013.01); *B62B 5/0083* (2013.01); *B62B 2206/02* (2013.01)

(58) Field of Classification Search
CPC .......... B62B 3/00; B62B 3/006; B62B 3/008; B62B 3/02; B62B 3/10; B62B 5/0083; B62B 5/0093; B62B 5/04; B62B 5/0433; B62B 2202/031; B62B 2202/90; B62B 2206/02; B62B 2207/00; B62B 2207/02; B62H 3/08
USPC ............................ 280/79.2, 79.3, 79.11, 79.4
See application file for complete search history.

(56) References Cited

U.S. PATENT DOCUMENTS

| | | | | |
|---|---|---|---|---|
| 4,471,971 A * | 9/1984 | Keesler | ..................... | B60P 3/40 280/35 |
| 5,249,823 A * | 10/1993 | McCoy | ..................... | B62B 3/02 280/144 |
| 5,599,031 A * | 2/1997 | Hodges | ................. | B62B 5/0083 280/35 |
| 5,609,461 A * | 3/1997 | Lichtenberg | .............. | B60P 3/07 280/79.11 |
| 6,095,746 A * | 8/2000 | Bergin | .................. | B62B 5/0083 269/17 |
| 6,109,625 A * | 8/2000 | Hewitt | ................ | B60B 33/0007 280/43.24 |
| 6,109,644 A * | 8/2000 | Cox | .......................... | B62B 1/20 280/47.24 |
| 6,464,207 B2 * | 10/2002 | Creel | ...................... | B66F 15/00 254/10 C |
| 6,783,147 B1 * | 8/2004 | Green, Sr. | ................. | B62B 1/20 280/47.26 |
| 7,278,647 B1 * | 10/2007 | Keenan | ................... | B60S 13/00 280/79.11 |
| 7,287,766 B2 * | 10/2007 | Kilday | .................. | B62B 5/0083 280/35 |

(Continued)

Primary Examiner — Leslie A Nicholson, III
Assistant Examiner — Kimberley S Wright

(57) ABSTRACT

A multipurpose stand includes a first supporting unit, a second supporting unit and a vertical member. the first supporting unit includes the main body and the roller, the second supporting unit includes the first broad member, the second broad member and the third broad member, The vertical member comprises the first vertical section, the second vertical section and the enlarged end, wherein the second supporting unit is formed by cutting a plate material into the first broad member and the second broad member. The member connected with the third broad member is connected with the connecting member through a single point of the second supporting unit and the first supporting unit, and a vertical member is set between the first broad members of the second supporting unit.

7 Claims, 11 Drawing Sheets

(56) References Cited

U.S. PATENT DOCUMENTS

| | | | | |
|---|---|---|---|---|
| 8,052,159 B2* | 11/2011 | Chen | ........................ | B62H 1/02 |
| | | | | 280/79.11 |
| 8,091,905 B2* | 1/2012 | Chen | ........................ | B25H 5/00 |
| | | | | 280/32.6 |
| 8,251,379 B2* | 8/2012 | Watzke | ................... | B62B 1/125 |
| | | | | 280/35 |
| 8,910,957 B1* | 12/2014 | Hassell | ................... | B60P 3/127 |
| | | | | 254/105 |
| 9,010,770 B2* | 4/2015 | Cantrell | ............... | B62B 5/0083 |
| | | | | 280/35 |
| 2004/0090029 A1* | 5/2004 | Hardesty | ............... | B62B 5/0083 |
| | | | | 280/79.11 |

* cited by examiner

MULTIPURPOSE STAND

BACKGROUND OF THE INVENTION

Field of the Invention

The present invention relates to a multipurpose stand, and more particularly to a multipurpose stand for a heavy motorcycle which provides a vertical member for equipment storage.

Description of the Related Art

Riding heavy bikes is a very popular hobbit, and due to the heavy weight of the bike, stationary stands for motorcycles sometime is necessary for the riders. Typical stationary stands for motorcycles requires complicated manufacture processes.

Motorcycle riders usually wear special gears for the ride such as helmets, body armors, boots, gloves, and the gears should be air dry after use for sanitation reason.

Therefore, it is desirable to provide a multipurpose stand for a heavy motorcycle to mitigate and/or obviate the aforementioned problems.

SUMMARY OF THE INVENTION

An objective of the present invention is to provide a multipurpose stand system for vehicles for transmitting power signals and sensing data.

In order to achieve the above mentioned objective, a multipurpose stand has:

a first supporting unit having a main body having plurality of rollers, a connecting aperture, a first fastening device;

a second supporting unit having a first broad member, a second broad member, a third broad member and a connecting member; the first broad member further having: a plurality of first positioning apertures, and a plurality of second positioning apertures; the second broad member further having a plurality of third positioning apertures, and a plurality of first securing apertures, the plurality of second fastening devices, the first positioning aperture of the first broad member and the third positioning aperture being aligned and engaged with each other via second fastening devices; the third broad member further having: a fourth positioning aperture and a plurality of second securing apertures, the fourth positioning aperture be configured to engage with the connecting aperture of the main body, and the second securing aperture being corresponding to one side of the connecting member; the connecting member having two foldable boards engaged with the first securing aperture of the second broad member and the second securing aperture of the third broad member via a plurality of engaging members; the connecting aperture engaged with the fourth positioning aperture of the third broad member of the second supporting unit via the first fastening device; the first positioning aperture aligned with the third positioning aperture of the second board member; and a vertical member having a first vertical section, a second vertical section and an enlarged end; the first vertical section further having a plurality of first through apertures, a plurality of the adjusting apertures, a plurality of third fastening devices; the first fastening device configured to engage with the second through aperture of the second vertical section, and the adjusting aperture configured to engage with the second positioning aperture of the first broad member of the second supporting unit via the third fastening device; the second vertical section further having: a plurality of second through apertures, a plurality of third through apertures, a fourth device and a fifth fastening device; the second through aperture configured to engage with the first through aperture of the first vertical section via the fourth fastening device; the third through aperture engaging with the fifth fastening device.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
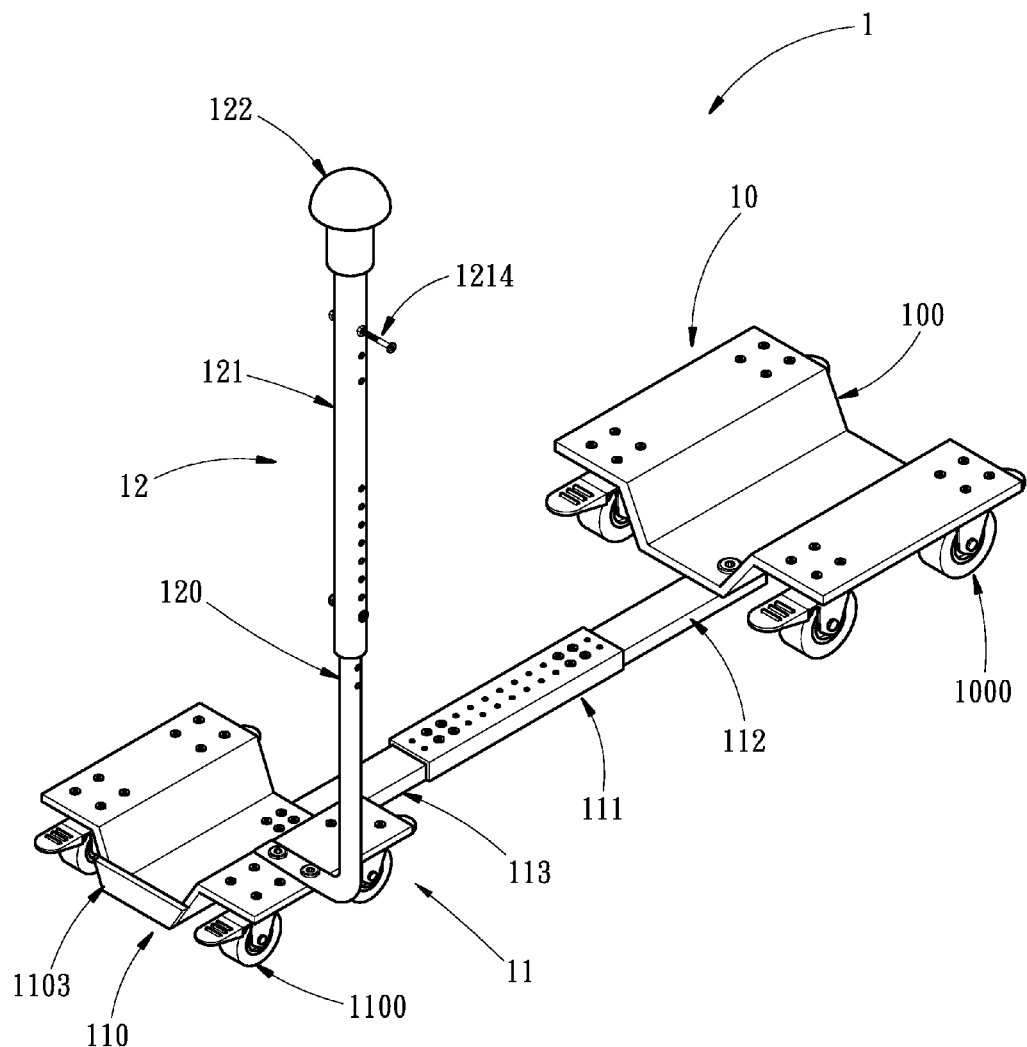
FIG. 1 is a perspective drawing of a multiple purpose stand according to an embodiment of the present invention.
Figure 2:
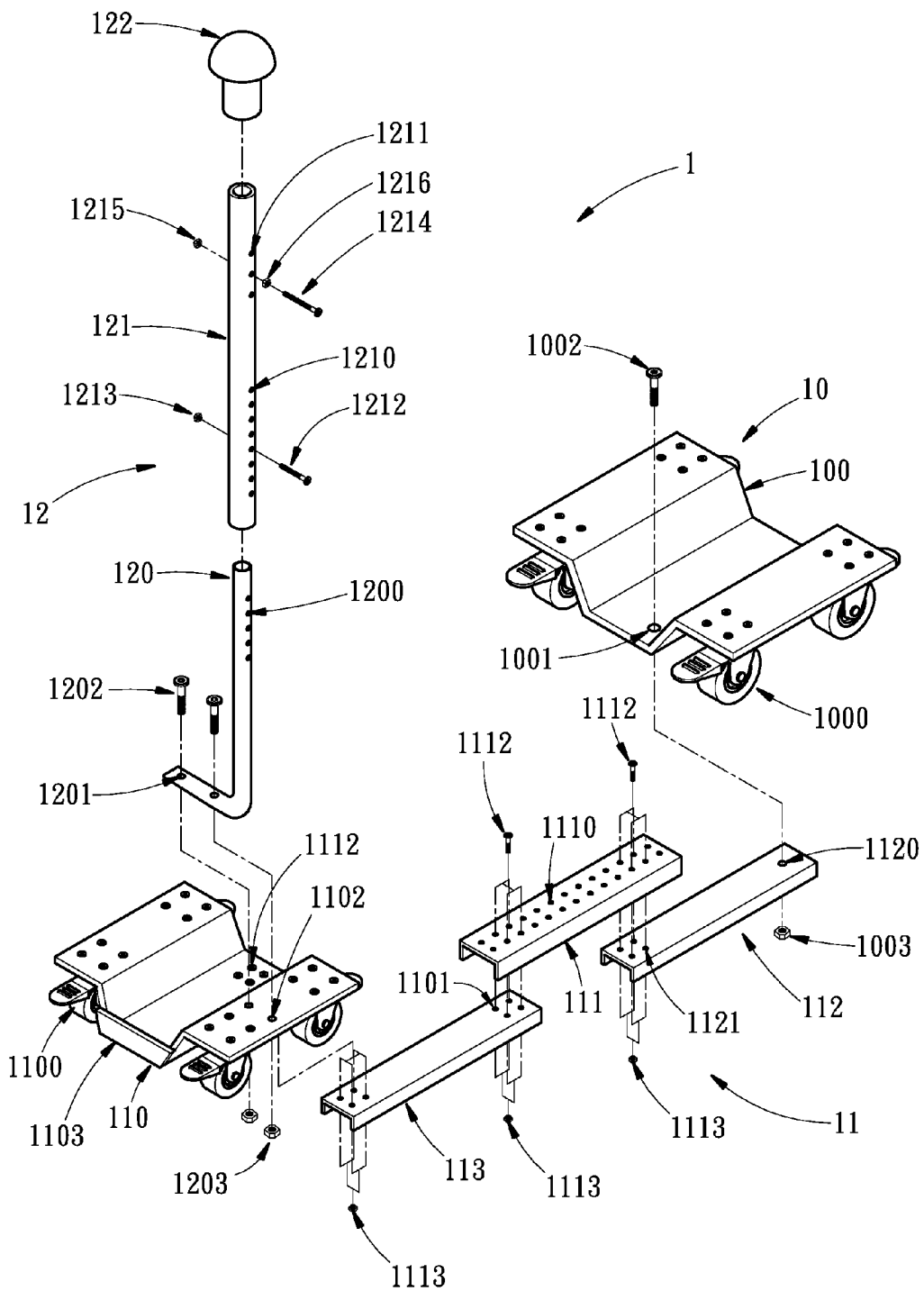
FIG. 2 is an exploded view of the multiple purpose stand according to the embodiment of the present invention.
Figure 3:
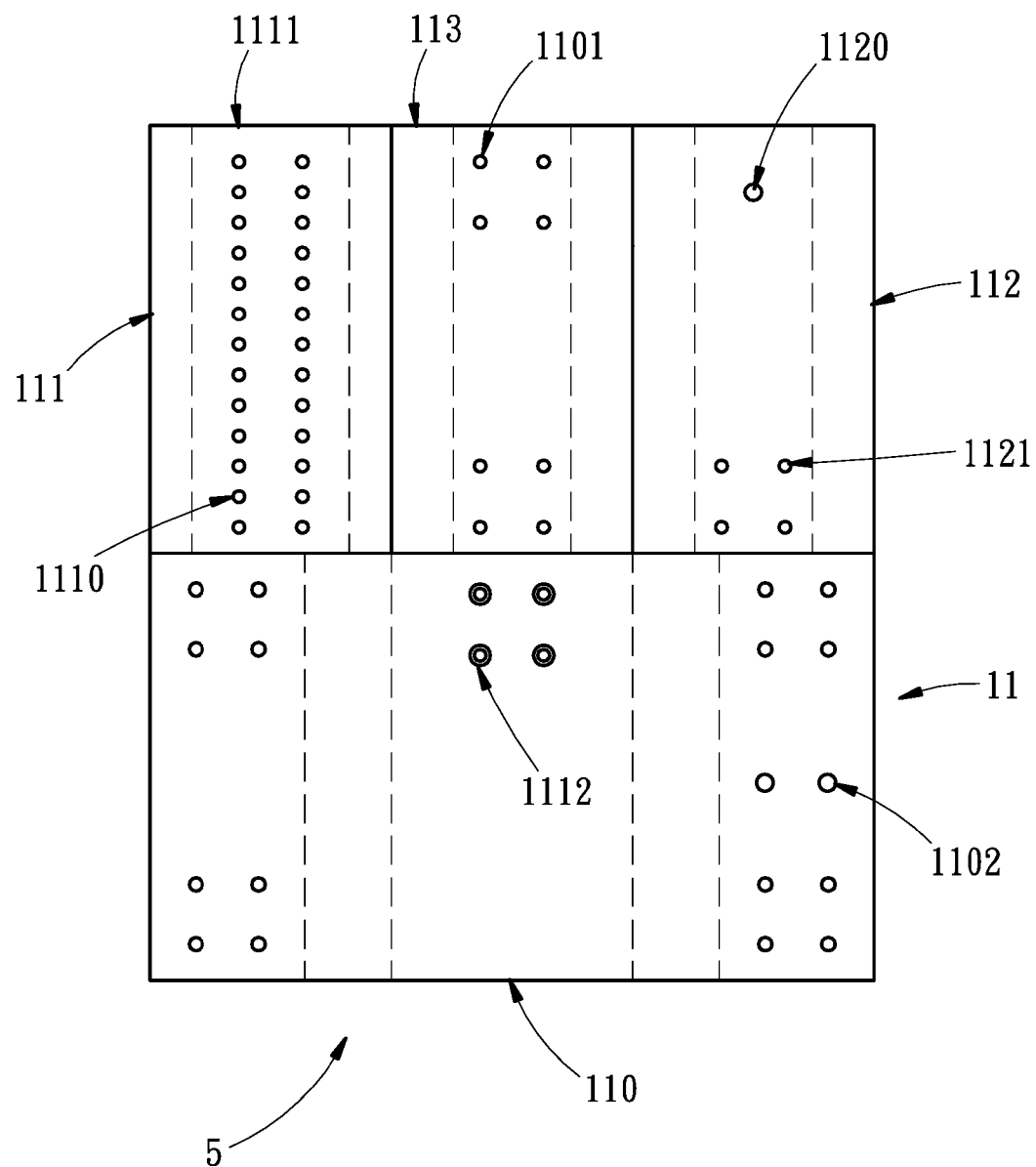
FIG. 3 is a schematic drawing of a second supporting unit of the multiple purpose stand according to the embodiment of the present invention.

As shown in FIGS. 1-3, A multipurpose stand 1 comprises a first supporting unit 10, a second supporting unit 11 and a vertical member 12. The first supporting unit 10 further comprises a main body 100 and a plurality of rollers 1000. The main body 100 is a U-shaped object with two wings, and the rollers 1000 are respectively disposed under a front end and a rear end of two wings of the main body 100. The roller 1000 has 360° rotation and linear movement abilities. The main body 100 is provided with a connecting aperture 1001 at one end, and the connecting aperture 1001 is configure to align with the fourth positioning aperture 1120 of the third broad member 112 of the second supporting unit 11, and the connecting aperture 1001 and the fourth positioning aperture 112 are secured with the first locking member 1002 and the first nut 1003.

The second supporting unit 11 further comprises a first broad member 110, a second broad member 111, a third broad member 112 and the connecting member 113. As shown in FIG. 3, all of the first broad member 110, the second broad member 111, and the third broad member 112 are cut from a plate 5. The first broad member 110 has an upside-down T shape, the second broad member 111 and the third broad member 112 have similar shapes. The first broad member 110 is provided with a plurality of first positioning apertures 1101 and a second positioning aperture 1102 extending from the center to the one end, and the roller 1100 is disposed at the front and rear ends of the lower ends of the two side flaps. The positioning aperture 1101 corresponds to the third positioning aperture 1110 of the second broad member 111, and the second positioning aperture 1102 corresponds to the adjustment aperture 1201 of the vertical section 120 of the vertical member 12.

One end of the second broad member 111 is provided with a plurality of third positioning apertures 1110 and another end is provided with a plurality of first securing apertures 1111, the third positioning apertures 1110 are configured for corresponding to the first positioning aperture 1101 of the first broad member 110 and are secured with the second screw 1112 and a second nut 1113. The first securing aperture 1111 engages with the second securing aperture 1121 of the third broad member 112 via the connecting member 113 and is secured with the plurality of engaging members 1130.

The third broad member 112 has an approximately circular arc shape at one end and is provided with a fourth positioning aperture 1120, and a plurality of the second aperture apertures 1121 formed at an opposite end and 1001. The fourth positioning aperture 112 is corresponding to the connection aperture 1001 of the main body 100 and secured by the first screw 1002 and the first nut 1003. The second securing aperture 1121 is configured to correspond to the connecting member 113 and is secured with the engaging members 1130 so that the second broad member 111 and the third broad member 112 is connected and foldable.

The connecting member 113 is an auxiliary rotating shaft having two wings provided with a plurality of through apertures. One of the wing is secured with one end of the second broad member 111, and the another wing is secured with one end of third broad member 112 by the engaging members 1130.

The vertical member 12 further comprises a first vertical section 120, the second vertical section 121 and the enlarged end 122. The first vertical section 120 is approximately L-shaped and have a plurality of first through apertures 1200 at one end thereof. The first through aperture 1200 correspond to the second through aperture 1210 of the second vertical section 121 and is secured by the fourth screw 1212 and the fourth nut 1213. The adjustment aperture 1201 is provided at the other end of the first vertical section 120, which corresponds to the second positioning aperture 1102 of the first broad member 110 and is secured by the third screw 1202 and the third nut 1203, The second vertical section 121 is a hollow rod body and has a plurality of second through apertures 1210 at one end, and the second through aperture corresponds to the first through aperture 1200 of the first vertical section 120 and is secured by a fourth screw 1212 and a fourth nut 1213. A plurality of third through apertures 1211 are provided at another end of vertical section 121, which is engaged with the fifth screw 1214, the fifth nut 1215 and the sixth nut 1216, and the sixth nut 1216 is used for adjustment to fit different diameters of the second vertical section 121

The enlarged end 122 is provided with in a recess at one end which is used for engaging with one end of the second vertical section 121 to provide an object to be set.

Figure 4:
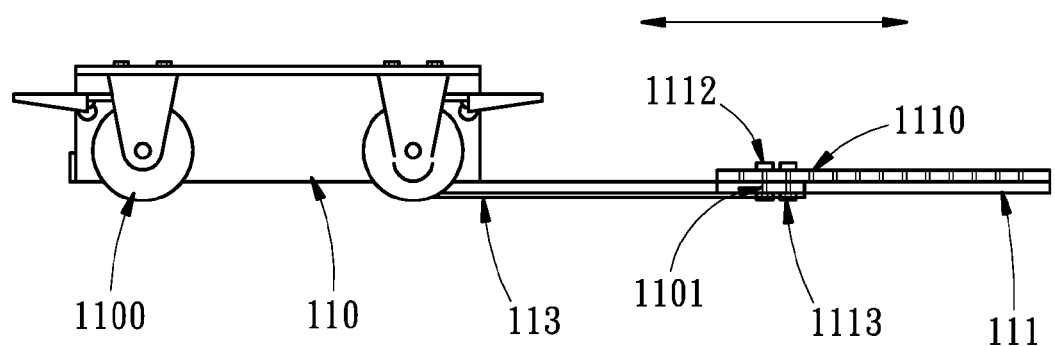
FIG. 4 is a schematic drawing of a first broad member and a second broad member of the second supporting unit of the multiple purpose stand according to the embodiment of the present invention.
Figure 5:
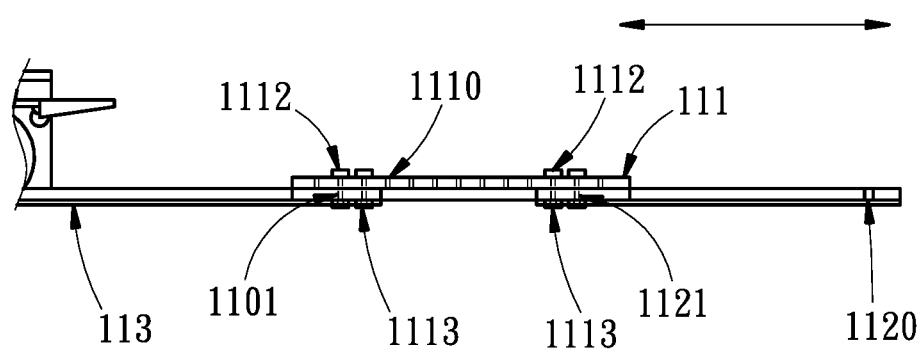
FIG. 5 is a schematic drawing of the second broad member and a third broad member of the second supporting unit of the multiple purpose stand according to the embodiment of the present invention.

As shown in FIGS. 3 to 7, the multiple purpose stand 1 shown in FIGS. 3 and 4, in which the first broad member 110 has a plurality of first positioning aperture 1101 at one end corresponding to the third positioning aperture 1110 of the second broad member 111, and is secured by the second fastening device 1112, 1113;

As shown in FIGS. 3 and 5, the second broad member 111 and the third broad member 112 are connected by a connecting member 113, and the second broad member 111 has a plurality of first securing apertures 1111, the third broad member 112 has a plurality of second securing apertures 1121. The through apertures of the connected member 113 correspond to the second securing aperture 1111 of the second broad member 111 and the second securing aperture 1121 of the third broad member 112 so that the third broad member 112 is foldable.

Figure 6:
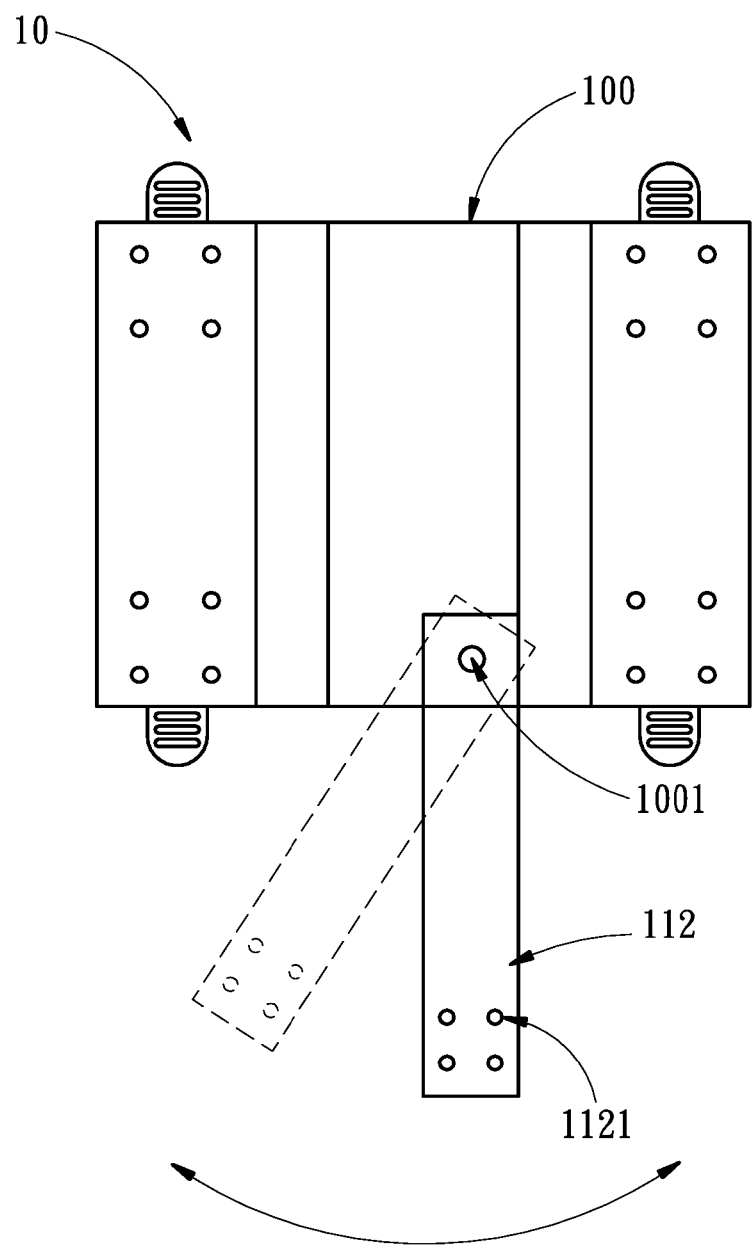
FIG. 6 is a schematic drawing showing the connection between the first supporting unit and the third broad member of the multiple purpose stand according to the embodiment of the present invention.
Figure 7:
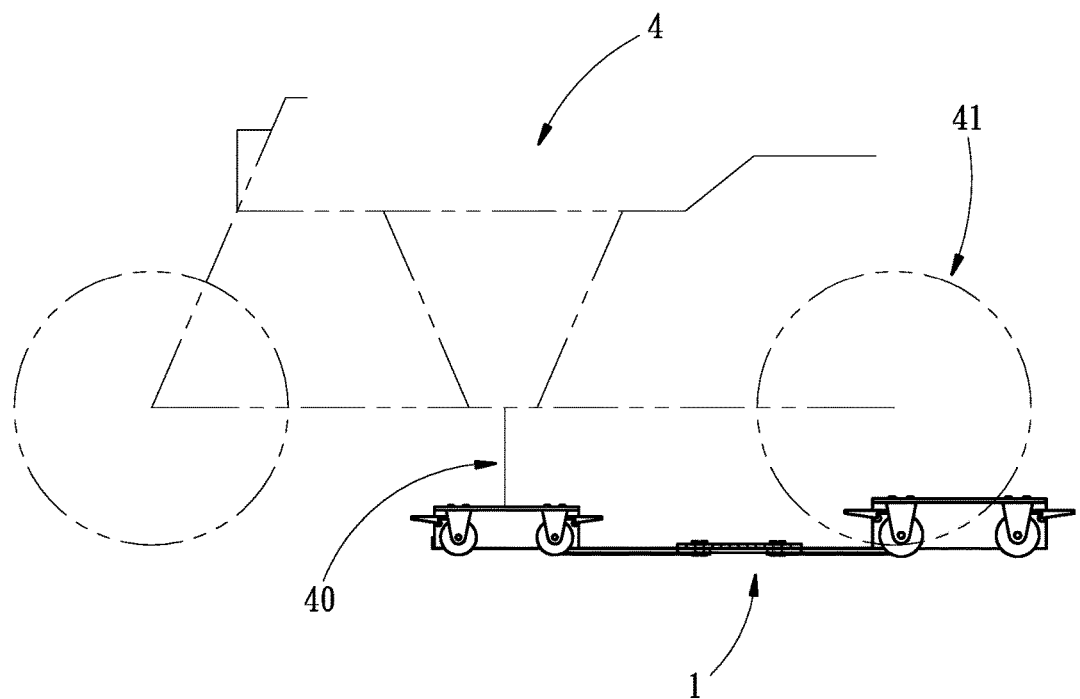
FIG. 7 is a schematic drawing showing the multiple purpose stand in use according to the embodiment of the present invention.
Figure 8:
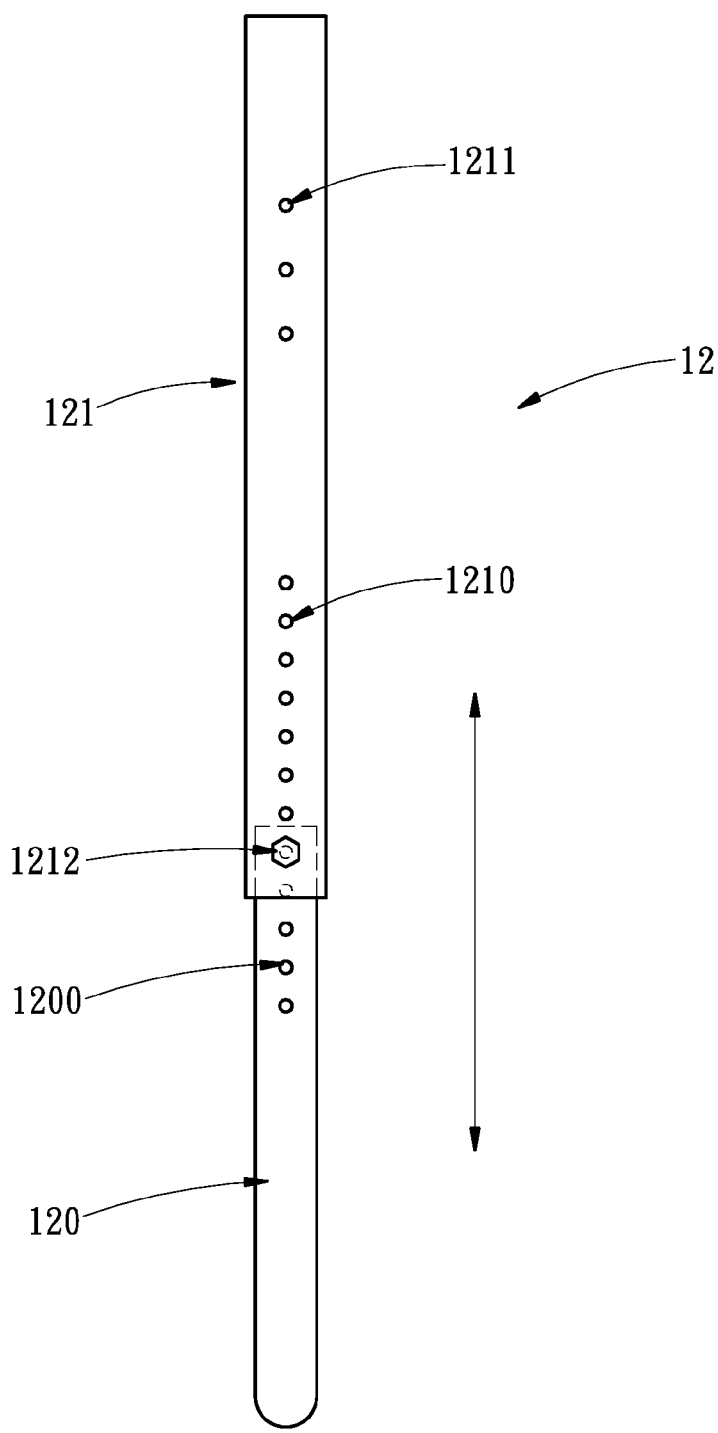
FIG. 8 is a schematic drawing showing the connection between the first vertical section and the second vertical section of the multiple purpose stand according to the embodiment of the present invention.

As shown in FIGS. 2, 3, and 6, the third broad member 112 has a fourth positioning aperture 1120 at one end thereof, which corresponds to the connecting aperture 1001 of the first supporting unit 10 and is secured with the first screw 1002 and the first nut 1003, so that the third broad member 112 can pivot around the first locking member 1002. As shown in FIGS. 6 and 7. The multiple purpose stand 1 is adjustable for fitting various lengths between of the rear wheel 41 and the kickstand 40 of the motorcycle 4. In addition, the third broad member 112 can make the movement of the motorcycle 4 even easier.

Figure 9:
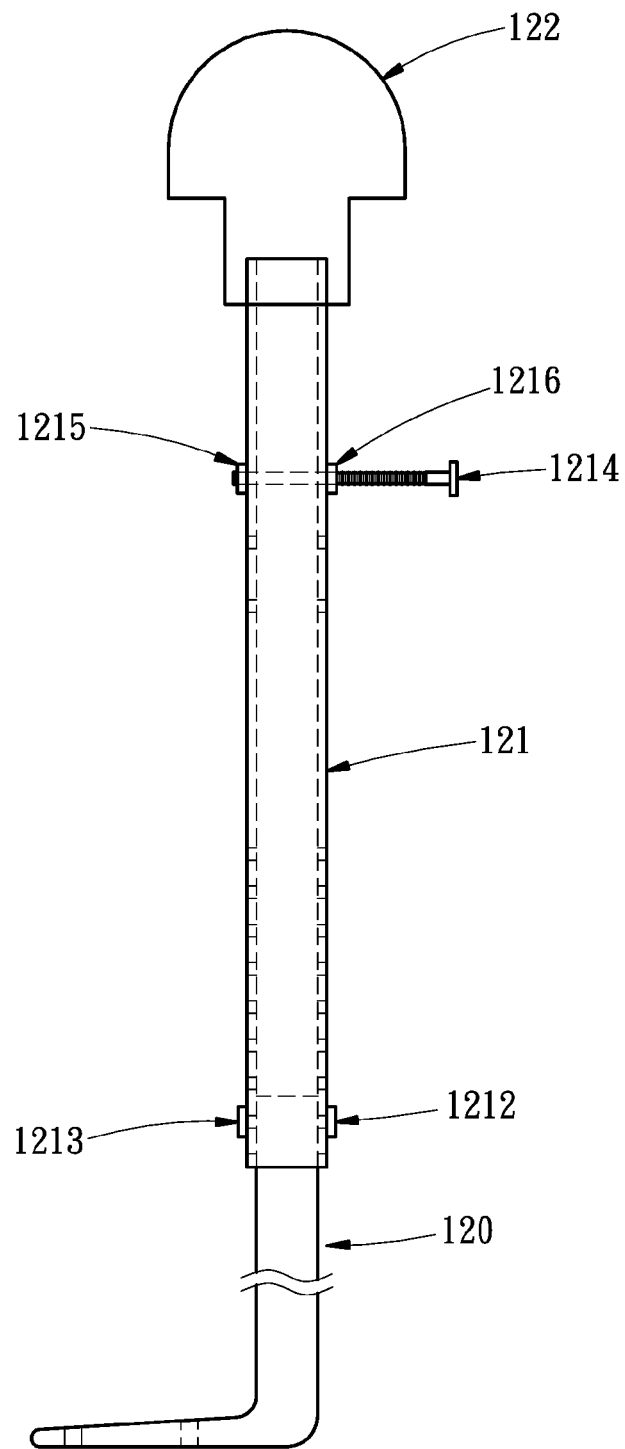
FIG. 9 is a schematic drawing showing the connection between the second vertical section and the enlarged end of the vertical member of the multiple purpose stand according to the embodiment of the present invention.
Figure 10:
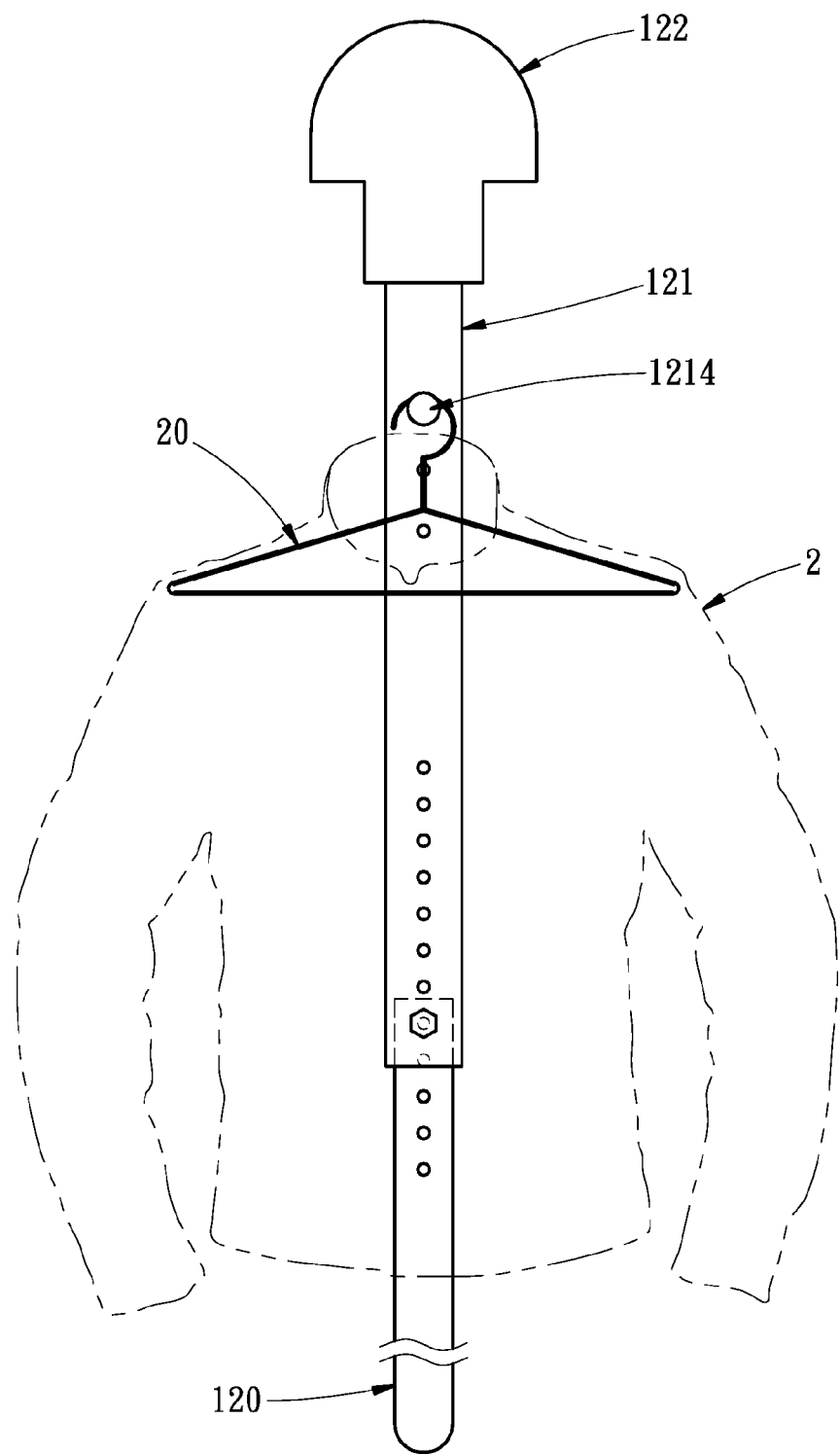
FIG. 10 is a schematic drawing showing the vertical member of the multiple purpose stand according to the embodiment of the present invention.
Figure 11:
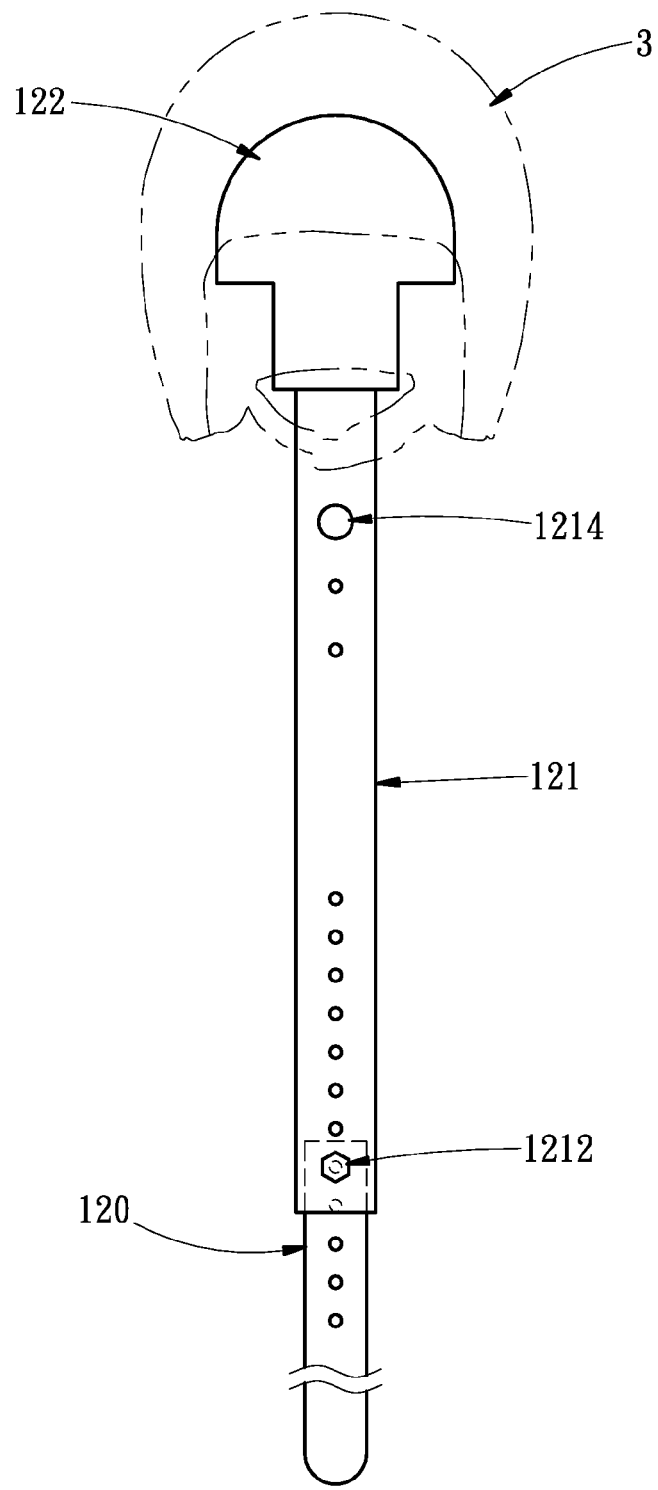
FIG. 11 is another schematic drawing showing the vertical member of the multiple purpose stand according to the embodiment of the present invention.

As shown in FIGS. 9 to 11, the vertical member 12 is composed of the first vertical section 120, the second vertical section 121 and the enlarged end 122. The first vertical section 120 has a plurality of first through apertures 1200, the second vertical section 121 has a plurality of second through apertures 1210 at one end thereof, one of the first through aperture 1200 and one of the second through aperture 1210 are aligned with each other and secured by the fourth screw 1212 and the fourth nut 1213. Another end of the second vertical section 121 is provided a plurality of third through apertures 1211 engaged with the sixth screw 1214, the sixth nut 1216, and the fifth nut 1215. The sixth nut 1216 is adapted to be adjusted for different diameters of the second vertical section 121 to securely hold the fifth screw 1214 by tightening the fifth nut 1215 and the sixth nut 1216.

The fifth screw 1214 is used for correspondence with the hanger 20 with the clothes 2, and the enlarged end 122 is provided for the helmet 3. With the combination of the vertical member 12 and the second supporting unit 11, the driver can park the vehicle easier and let the next ride more convenient access.

Although the present invention has been explained in relation to its preferred embodiment, it is to be understood that many other possible modifications and variations can be made without departing from the spirit and scope of the invention as hereinafter claimed.

What is claimed is:

1. A multipurpose stand comprising:
a first supporting unit comprising a main body having plurality of rollers, a connecting aperture, a first fastening device;
a second supporting unit comprising a first broad member, a second broad member, a third broad member and a connecting member; the first broad member further comprising: a plurality of first positioning apertures, and a plurality of second positioning apertures; the second broad member further comprising a plurality of third positioning apertures, and a plurality of first securing apertures, the plurality of second fastening devices, the first positioning aperture of the first broad member and the third positioning aperture being aligned and engaged with each other via second fastening devices; the third broad member further comprising: a fourth positioning aperture and a plurality of second securing apertures, the fourth positioning aperture be configured to engage with the connecting aperture of the main body, and the second securing aperture being corresponding to one side of the connecting member; the connecting member having two foldable boards engaged with the first securing aperture of the second broad member and the second securing aperture of the third broad member via a plurality of engaging members; the connecting aperture engaged with the fourth positioning aperture of the third broad member of the second supporting unit via the first fastening device; the first positioning aperture aligned with the third positioning aperture of the second board member; and a vertical member comprising a first vertical section, a second vertical section and an enlarged end; the first vertical section further comprising a plurality of first through apertures, a plurality of the adjusting apertures, a plurality of third fastening devices; the first fastening device configured to engage with the second through aperture of the second vertical section, and the adjusting aperture configured to engage with the second positioning aperture of the first broad member of the second supporting unit via the third fastening device; the second vertical section further comprising: a plurality of second through apertures, a plurality of third through apertures, a fourth device and a fifth fastening device; the second through aperture configured to engage with the first through aperture of the first vertical section via the fourth fastening device; the third through aperture engaging with the fifth fastening device.

2. The multipurpose stand as claimed in claim 1, wherein the plurality of first positioning apertures of the first broad member of the second supporting unit are configured to engage with the third positioning aperture of the second broad member, and the first positioning apertures are disposed in a horizontal line such that the second broad member can be adjusted at different positions.

3. The multipurpose stand as claimed in claim 1, wherein the second broad member and the third broad member are configured to engage with the connecting member such that the third broad member are able to be folded up.

4. The multipurpose stand as claimed in claim 1, wherein the main body of the first supporting unit has a connecting aperture configured to the fourth positioning aperture of the second supporting unit such that the third broad member is able to move.

5. The multipurpose stand as claimed in claim 1, wherein the fifth fastening device of the second vertical section of the vertical member is capable of being used as a hooking rod.

6. The multipurpose stand as claimed in claim 1, wherein the enlarged end of the vertical member is capable of being used for placing a helmet.

7. The multipurpose stand as claimed in claim 1, wherein the third through aperture is engaged with the fifth fastening device and a securing nut.

* * * * *